United States Patent
Doglioni Majer

(10) Patent No.: US 8,333,301 B2
(45) Date of Patent: Dec. 18, 2012

(54) METHOD AND APPARATUS FOR PREPARING BEVERAGES FROM SOLUBLE PRODUCTS

(75) Inventor: Luca Doglioni Majer, Carate Urio (IT)

(73) Assignee: Rhea Vendors S.p.A., Caronno Pertusella (VA) (IT)

( * ) Notice: Subject to any disclaimer, the term of this patent is extended or adjusted under 35 U.S.C. 154(b) by 529 days.

(21) Appl. No.: 12/067,702

(22) PCT Filed: Oct. 3, 2006

(86) PCT No.: PCT/IB2006/002740
§ 371 (c)(1),
(2), (4) Date: May 4, 2008

(87) PCT Pub. No.: WO2007/045949
PCT Pub. Date: Apr. 26, 2007

(65) Prior Publication Data
US 2008/0233264 A1    Sep. 25, 2008

(30) Foreign Application Priority Data
Oct. 19, 2005 (IT) .............................. MI2005A1986

(51) Int. Cl.
*B67D 7/78* (2010.01)
(52) U.S. Cl. ...... 222/1; 222/129.4; 222/145.6; 426/569; 426/594; 141/9; 141/104; 99/305
(58) Field of Classification Search .......... 222/1, 129.1–222/129.4, 145.6, 146.6, 148; 99/299, 305–306, 99/309, 323; 426/569, 590, 594; 141/9, 99/18, 100, 104, 367, 392
See application file for complete search history.

(56) References Cited

U.S. PATENT DOCUMENTS

| | | | |
|---|---|---|---|
| 4,903,585 A * | 2/1990 | Wimmers et al. | 99/275 |
| 7,537,138 B2 * | 5/2009 | Saggin et al. | 222/1 |
| 2004/0118871 A1 * | 6/2004 | Coronado et al. | 222/129.1 |
| 2005/0095341 A1 * | 5/2005 | Sher et al. | 426/594 |
| 2005/0127098 A1 | 6/2005 | Bertone | |

FOREIGN PATENT DOCUMENTS

| | | |
|---|---|---|
| FR | 2113660 A | 6/1972 |
| WO | 03041546 A | 5/2003 |

\* cited by examiner

*Primary Examiner* — Kevin P Shaver
*Assistant Examiner* — Andrew P Bainbridge
(74) *Attorney, Agent, or Firm* — Hess Patent Law Firm PC; Robert J. Hess

(57) ABSTRACT

A method for the preparation of a beverage by mixing water and at least one powdered product in a mixing chamber and dispensing the mixture to a final container. The method includes preparation and delivery of at least a first portion of beverage by mixing a first soluble product with water, either in the absence of mechanical stirring or with rotating a rotor at a rotor rotation speed of less than 500 rpm. The method also includes the preparation and delivery of at least a second portion of beverage by mixing a second soluble product with water in the presence of mechanical stirring and for the delivery of further portions of beverage to the final container.

17 Claims, 3 Drawing Sheets

METHOD AND APPARATUS FOR PREPARING BEVERAGES FROM SOLUBLE PRODUCTS

BACKGROUND OF THE INVENTION

The present invention relates to a method and apparatus for the preparation of beverages from soluble products by mixing one or more of said products with water, in particular, for the preparation of beverages using animal or vegetable milk. The invention relates more particularly to a method and apparatus for the preparation of beverages produced in machines provided with a mixer group that receives a volume of water and at least one prepared soluble product to give beverages such as cappuccino, latte macchiato, drinking chocolate and similar.

Preferred soluble products used in the method according to the invention are dehydrated milk (powdered milk) and chocolate preparations. For the purposes of the present description of the invention, the term "soluble product" refers to any product which will dissolve in water, and the term "dehydrated milk" or "powdered milk" refers to any product that is used with the function of milk for the preparation of beverages; this includes therefore both milk-based products i.e. "dairy" products, and products called "whiteners" that are not milk-based (known also as "non-dairy creamers"). Such products are generally treated so as to increase their solubility and their speed of solution in water, for instance by producing them in the form of aerated pellets.

The known apparatus for preparing and dispensing beverages mixed from soluble products comprises a mixing chamber, generally conical in shape and a mixer element—such as a rotor, for instance. The base of the mixing chamber contains a means of dispensing the beverage; the means of delivering the prepared soluble product is located above the chamber.

In some machines there are also devices to produce coffee by infusion from ground coffee: the fresh coffee thus produced is mixed in the mixer or added to the already reconstituted milk present in the final container (cup, beaker or carafe), to produce cappuccino, latte macchiato or other desired beverages.

In the field of beverage-dispensing machines there is a constant need to improve the quality of the dispensed beverage by making it more and more similar to—and even better than—the corresponding freshly prepared beverage. Research has concentrated on improving the prepared products used for the beverage—by using liquid milk or syrups, for instance, as in US2005127098—to improve the characteristics of the beverage produced. Other proposals have suggested various methods of producing an improved "milk froth".

The aforementioned solutions have, however, the disadvantage of considerable mechanical complication of the machine: the use of liquid milk, for instance, involves the need to refrigerate the reservoir that contains it and to carry out periodic sterilization of the same to prevent contamination of the product by micro-organisms. The use of syrups also involves considerable complication of construction and maintenance.

SUMMARY OF THE INVENTION

There is, therefore, a need to improve the quality of beverages dispensed by automatic machines (for instance, HoReCa (hotel, restaurant, café) vending or dispensing machines) in a simple, economic and hygienic way.

Another requirement is to differentiate the beverages that can be produced by automatic machines, particularly milk- and coffee-based beverages, from a visual point of view. A caffelatte, for instance, should have a uniform coloration typical of caffelatte, while a latte macchiato should be visually different from the caffelatte; it should have a typical "layered" coloration, for instance.

The purpose of the present invention is to resolve the aforementioned problems and to provide a method and apparatus that allows good quality beverages to be obtained simply and economically.

Such purpose is achieved by the present invention that relates to a method for the preparation of beverages characterized according to claim 1.

The invention furthermore relates to an apparatus according to claim 11.

It was surprisingly discovered that to achieve a considerable improvement in the organoleptic characteristics of a beverage containing powdered milk and to differentiate the visual characteristics of the same, it was sufficient to intervene in the mixing step and prepare at least a portion of the beverage in the absence of mechanical stirring. This can be achieved while using the same components in the mixing group as in the present art, but by using different methods of preparation, depending on the beverage desired.

The term "in the absence of mechanical stirring" should be understood to mean both mixing the powder and water with the rotor stopped, and mixing the powder and water with the rotor operated at reduced speed, i.e. lower than 500 rpm; the latter procedure is used to improve dissolving the powdered product without otherwise creating the considerable quantity of froth produced when the rotor is rotated at high speeds.

According to an embodiment of the invention, the delivery of a powdered product to the mixing chamber is interrupted and then resumed after a time period that can be preset or set by the user.

According to a further embodiment of the invention, the coffee required to produce matte macchiato or cappuccino is dispensed into the final container with a delay of between 5 and 45 seconds after dispensing of the milk has ended and more preferably between 8 and 35 seconds.

Delivering the water and a part of the powdered product to the mixer before the beginning of the stirring step, or interrupting the stirring after it has begun, for a period of time preset or determined by the user, produced a surprising improvement in the visual and taste structure of the beverage, which appears to produce for parity of ingredients more "body" and better "texture" of the components of the same beverage.

Another surprising advantage consists in the fact that coffee added to a milk base at least partly obtained in the absence of mechanical stirring (for instance produced with the said delay in beginning the mechanical stirring step) gives a layered coloration of the beverage. In other words, the coffee is confined to an upper zone of the beverage, under the froth, while the lower portion of the beverage is substantially comprised of milk and therefore white.

The layered coloration obtained with the method of the present invention allows a beverage of quality, produced using the individual products and treating them separately (or rather using powdered milk and coffee prepared separately at the moment of use and then mixed), to be visually differentiated from a beverage produced by using only one prepared soluble product containing a mixture of powdered milk and soluble coffee which produces a beverage thought to be of lower quality.

A further advantage is given by the fact that the invention does not require new parts to be added to existing apparatus; it need only be re-set so that it carries out the method according to the invention. The new settings are normally applied by re-programming the CPU that controls the machine; clearly, the means of controlling the delivery (CPU) must be capable of being re-programmed in the way described below, and of controlling the components of the machine that handle the dispensing so as to make them operate according to the imposed variables.

BRIEF DESCRIPTION OF THE DRAWINGS

Further characteristics and advantages of the present invention will become clearer from the description that follows, which is by way of example and not limiting, with reference to the attached schematic drawings, in which.

DESCRIPTION OF THE PREFERRED EMBODIMENT

Figure 1:
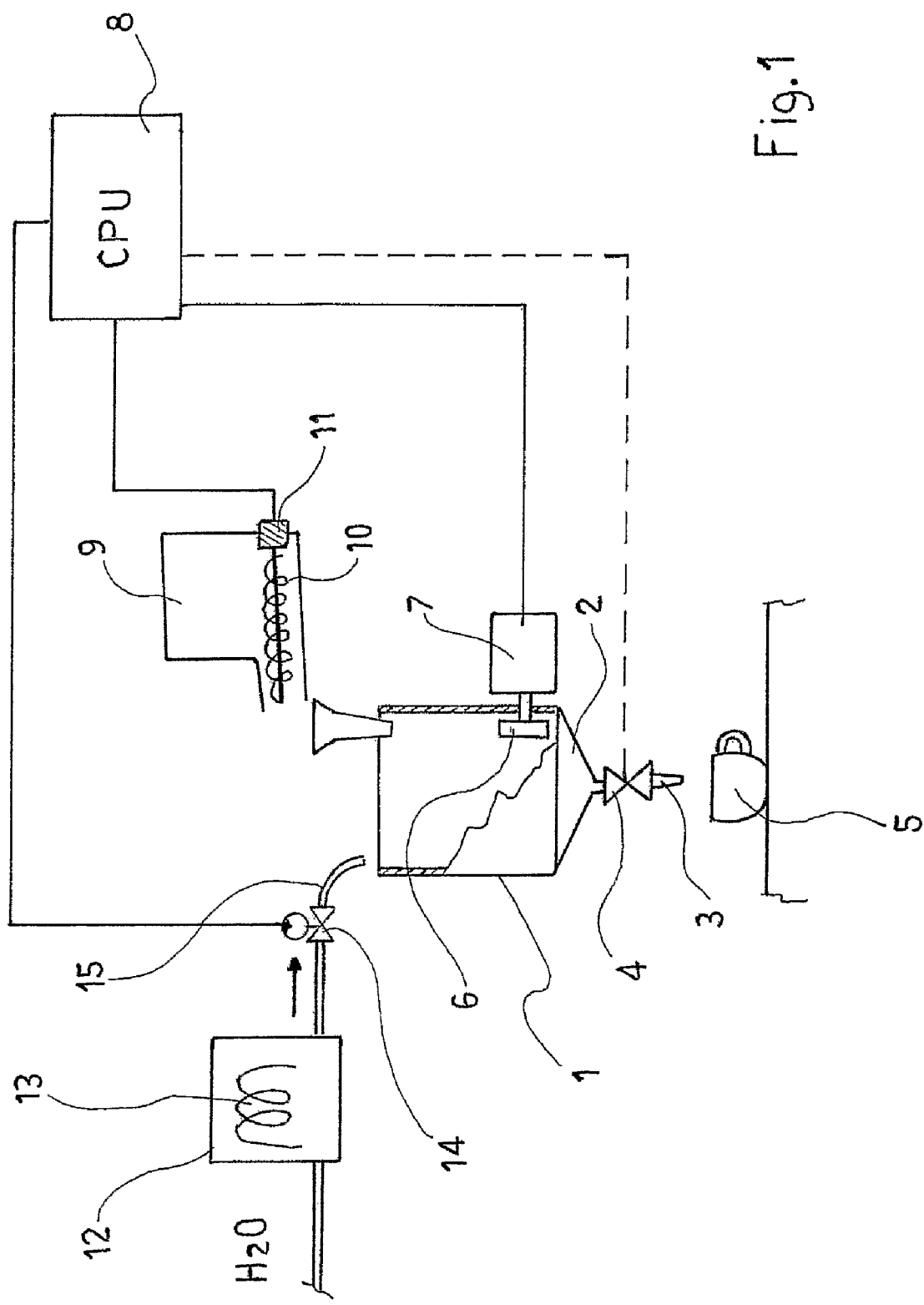
FIG. 1 is an outline of the mixing group of an apparatus according to the present invention.

As above mentioned, with reference firstly to FIG. 1, the mixing group includes a mixing chamber 1, generally with a conical-shaped base 2. The base 2 of the mixing chamber 1 comprises a means of dispensing the beverage comprising an exit duct 3 on which is fitted a means 4 of controlling the outflow of the beverage from the mixing chamber 1 into the cup, glass or other final container 5.

The means 4 can be constituted by a valve actuated by means of control 8 (as shown by a line shown in FIG. 1) or, preferably, is constituted by one or more restrictions of the exit duct 3, to regulate the outflow of the beverage from chamber 1.

There is also an element for actively mixing the liquid and solid components of the beverage, constituted for instance by a rotor 6 operated by an electric motor 7 controlled by the means of control 8 of the actuation of the components of the dispensing group. The means 8 could, for instance, be a CPU already known to the art for this purpose. The rotor 6 could be located inside the chamber 1 or also externally to it, i.e. on the duct dispensing the beverage, so as to agitate the liquid and to achieve mixing of the components and to create the "froth" typically required of milk-based beverages.

Means of delivering the prepared soluble product and means of delivering water are present above the chamber 1.

FIG. 1 shows only one means of delivery of a soluble product, in this case powdered milk, comprising a container 9 inside of which is provided a delivery screw 10 operated by an electric motor 11 controlled by the CPU 8.

The means of delivering water to the mixing chamber comprise a reservoir 12 provided internally with heating and/or cooling means 13. A duct 15, provided with means of control 14 of the flow of water controlled by the CPU 8, delivers the desired volume of water to the mixing chamber 1. In one embodiment, the means 14 are constituted by an electro-valve, but other means of supplying the desired quantity water to the chamber 1 in a controlled way are obviously possible, as for instance pumps or the boiler-pump units described in WO2004/045351 in the name of the applicant.

Figure 2:
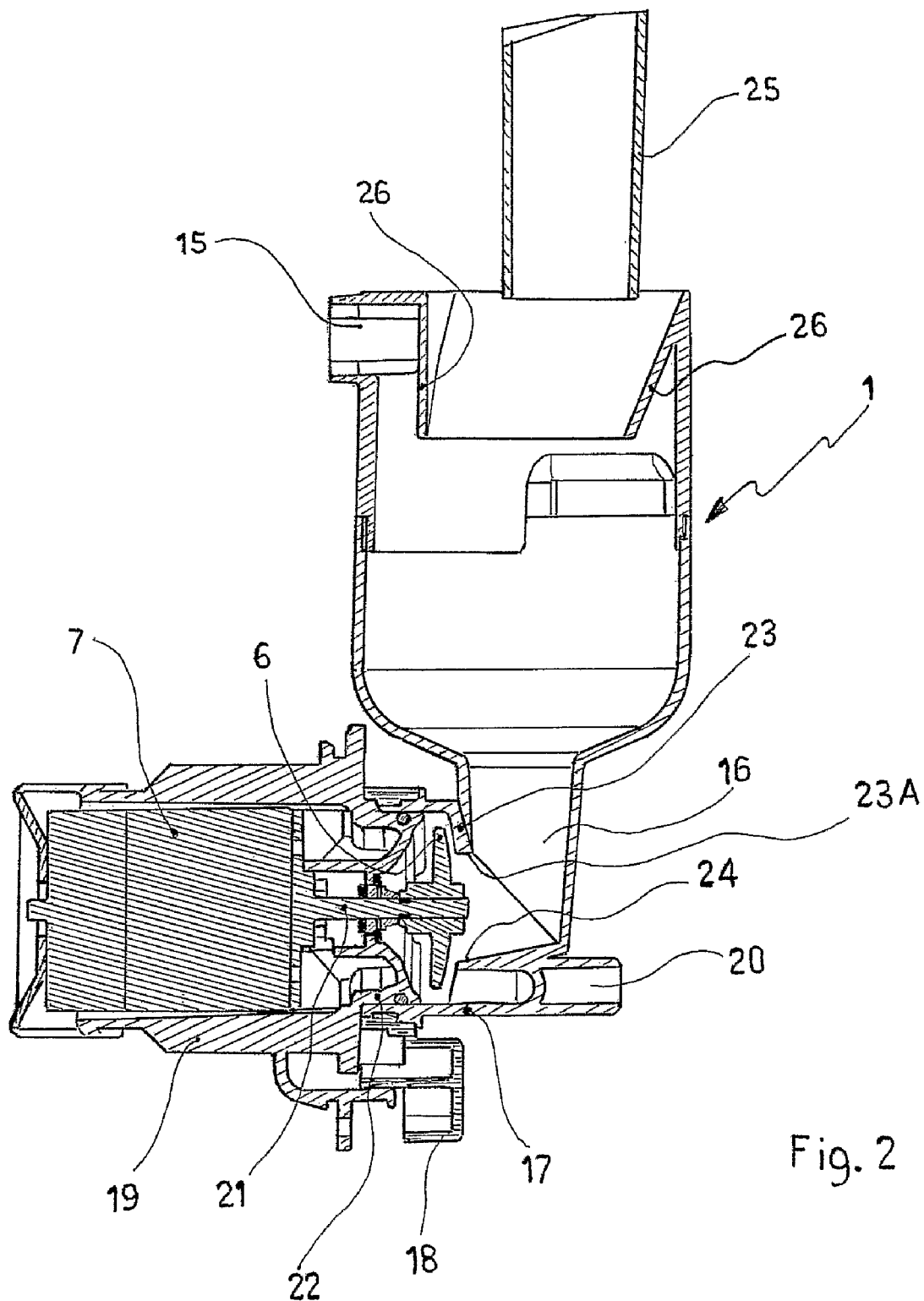
FIG. 2 is an enlarged sectional view of a mixer according to the invention.

FIG. 2 shows a preferred embodiment of the mixer for the mixing group according to the invention.

As shown, chamber 1 presents a lower exit duct 16 whose exit port is oriented sideways and transversal to the same and forms a housing 17 from which a beverage dispensing duct 20 extends. The duct 20 has a very small section compared to that of housing 17. A rotor 6 is located in housing 17, mounted on a drive shaft 21 operated by an electric motor 7 in a sealed housing 19; the front portion 22 of the housing 19 is attached to the housing 17 by a sealing lock-ring 18.

Above chamber 1 is a powdered-milk delivery duct 25 and a water delivery duct 15. The exit of the water duct 15 is preferably directed tangentially with respect to chamber 1 to direct the water flow against the wall of the same chamber; the exit of the duct 25 is screened by a trunco-conical septum 26 that extends from the upper edge of chamber 1.

Figure 6:
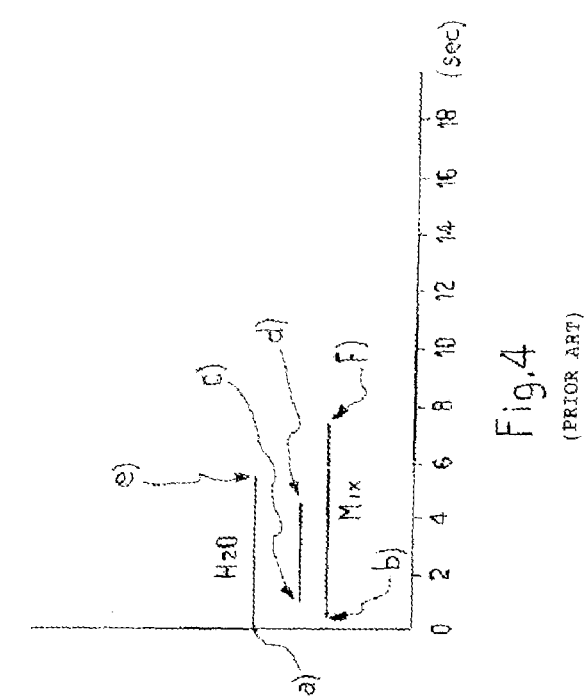
FIG. 6 is an outline of another embodiment of the method according to the present invention.

The rotor 6 presents an external face provided with a plurality of radial grooves (not shown) in a manner already known. As shown in FIG. 6, the rotor is located in proximity to the transversal portion of duct 16 and is so placed to create a reduced passage between the external face of the rotor and the wall 23 and the edge 24 of the transversal portion of the duct 16 respectively. Preferably, such distance is between $1/12$th and $1/6$th of the distance between the lower part 23A of the wall 23 and edge 24, or rather the distance between rotor 6 and portion 23A or edge 24 is a fraction between $1/12$th and $1/6$th of the width of the exit port of the duct 16 in the housing 17. In the present case, such distance is about 1.2-1.5 mm. In this way, good mixing and production of milk-froth are assured. Furthermore, the reduced dimensions cause at least partial solution or solubilization of the powdered milk in the water by mechanical action even with the rotor stopped.

As mentioned above, the solubilization, or dispersion, of the powdered product in the absence of mechanical stirring can be produced with other types of exit ducts and/or by operating the rotor at a reduced speed, for instance not above 500 rpm and in the order of 50-300 rpm; use of the rotor at low speeds is advisable for the solubilization of powdered products that have reduced solubility in water.

The method known and used for the preparation of the beverages uses the mixing group shown in FIG. 1 and in FIG. 2 and comprises a mixing step in which a succession of sub-steps provide for the introduction of water, generally heated (although cooled water is used in some cases), into the mixing chamber, the addition of powdered milk or analogous product and mixing under stirring. When used, the coffee part of beverage both for fresh coffee and for coffee in powder is prepared separately or in a step of the method that doesn't coincide with the preparation of the milk.

The mixing step in the known art generally starts operating the rotor simultaneously with or immediately following the delivery of water into the mixing chamber and is continuous until after the end of the delivery of powdered milk, or rather until the water delivered has completely crossed the mixing zone. In other words, according to the known method, all the powdered milk is mixed with the water with the help of the rotor before being delivered by gravity into the final container 5. The speed of the motor 7 is high and it can exceed 13,000 rpm: in this way complete mixing and homogenization of the powdered product with water is achieved, as well as the formation of the required froth (or cream or emulsion).

Summarising: the known methods provide the following succession of steps:

a) begin water delivery into the mixing chamber b) begin rotor rotation c) begin powdered product delivery
d) end powdered product delivery
e) end water delivery
f) end rotor rotation.

Figure 3:
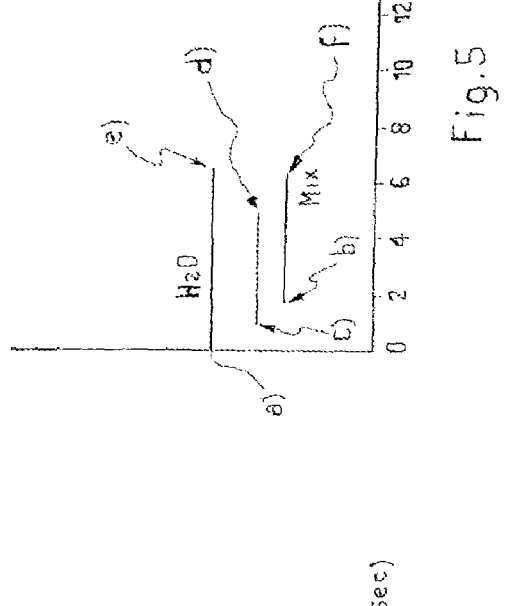
FIGS. 3 and 4 are outlines of methods of preparation of the mixture according to the known art.
Figure 4:
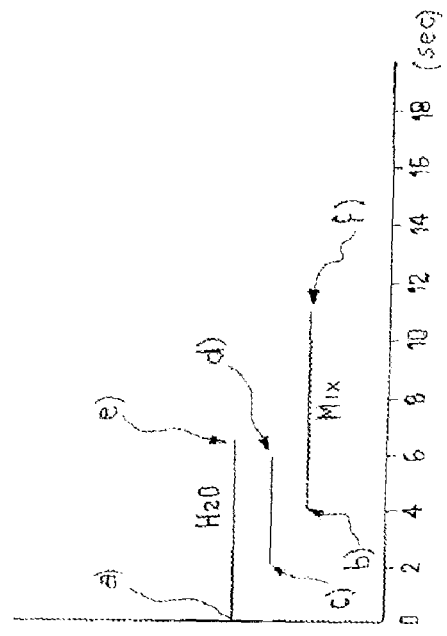

There is a short delay usually not exceeding around 3 seconds between beginning the water delivery and beginning the powdered milk delivery. FIGS. 3 and 4 show two representations of the mixing step of a method of preparation according to the known art described above.

The quantity of powdered milk used is generally between 0.3 g and 1.5 g of powdered product for every 10 ml of water. This ratio also remains in the method according to the present invention.

According to the invention it is possible to greatly improve the characteristics of the beverage dispensed by the mixing group by modifying the sequence of the above described steps so that a first portion of reconstituted milk that has not been subjected to high speed stirring, or rather to such a speed as to produce froth or emulsion, is delivered to the final container 5, and when needed, subsequently, a second portion of milk, stirred to give the required froth, is delivered. Preferably, the first and second portions of reconstituted milk are prepared in the same mixing chamber 1; nevertheless, in another embodiment of the invention they are prepared in separate containers: for instance, in a container similar to that where coffee is prepared from the relative soluble product, or in the said same container.

In the preferred embodiment, that is where the first, second and possible following portions of beverage are prepared in the same container, at least one of the portions is prepared in the absence of rotation of the rotor 6, even though, as mentioned above, it is possible to operate such rotor at a very slow speed, for instance in the order of 50-300 rpm, to facilitate the solubilization of powdered products that have reduced solubility.

Figure 5:
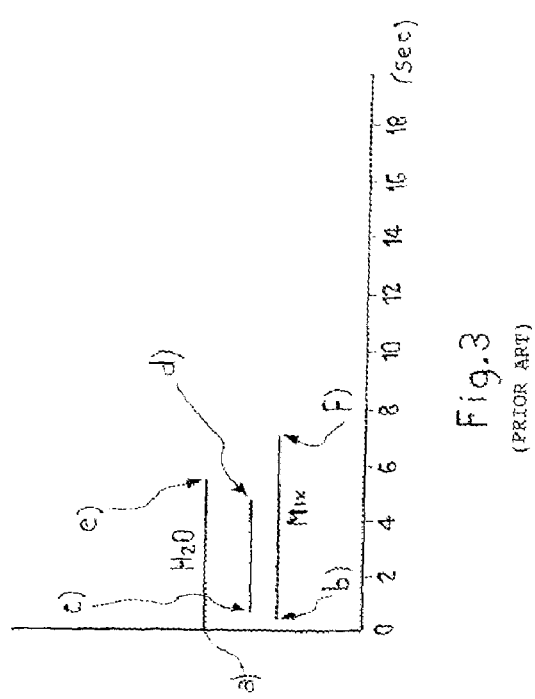
FIG. 5 is an outline of an embodiment of the method according to the present invention.

The preferred embodiment of the invention, in which the said first portion of milk is prepared in the absence of mechanical stirring, provides insofar, that step c) i.e. the step of beginning the powdered product delivery, is carried out before step b), i.e. the step of beginning stirring or rotation of the rotor, as shown in FIGS. 5 and 6.

In other words, in the preferred embodiment that makes use of the same hardware known and used, the method according to the invention provides for the rotor not to be operated immediately, but to delay the beginning of (or to interrupt) the stirring step so as to create a new step of the process in which the powdered product is saturated with water and dissolves (even if to an extent and by a method different from those known) in the water present in the container during the delivery of the same powdered product to the said container in the absence of mechanical stirring: the only stirring present is that due only to the delivery of water to the container.

Furthermore, such step of initial delay or interruption of the rotation of the rotor (or the equivalent rotation at very reduced speed) can subsequently also be repeated during the preparation of the beverage.

In other words, according to the invention a step will be carried out in which water and powdered product will be dispensed in the absence of rotation of the rotor, at least once, preferably at the beginning of the dispensing of the beverage. A first portion of milk can be delivered, for instance, with the rotor stopped, a second portion with the rotor operating, a third portion of the same product (e.g. powdered milk) or of a different product (e.g. chocolate), with the rotor stopped and a final dispensing of powdered milk with the rotor operating.

The invention likewise also provides, in addition or alternative to the rotor rotation pause, to interrupt delivery of the powdered product to the mixing chamber.

Without seeking to give a complete or binding explanation of the phenomenon, it is reasonable to accept that the solution step of the powdered product in the absence of mechanical stirring allows at least part of the same to re-acquire a texture similar to that of the original milk, different and with more "body" compared to that obtained with the rotor operating.

The difference of texture, or body, of the beverage is due to different density (or specific gravity, in g/ml) of the first portion compared to the second portion, presumably because of the incorporation of air in the liquid that occurs at high speeds of rotation of the rotor and which gives a less dense second portion of the beverage. Such difference gives a final product after the addition of the coffee portion of the beverage, in which coffee is visibly stratified in the upper part of the container, under the froth, and the lower part is mainly occupied by the white reconstituted milk. A further factor that presumably contributes to the stratification is the similar temperature in the two stratified products.

An interruption followed by a resumption of delivery of powdered product also presumably produces layers having different density. The two types of delay can be combined to give a great variety of beverage types.

The time interval between beginning delivery of the powdered product (step c) and beginning stirring (step b) is between 1 and 40 seconds, preferably between 1.5 and 15 seconds.

As shown (FIGS. 5 and 6), water delivery begins before steps b) and c); according to a preferred embodiment of the invention, the step ending delivery of the powdered product (step d) occurs before the step ending water delivery (step e) that, in turn happens before the end of the stirring, (step f).

As mentioned above, the apparatus for the preparation of a beverage according to the invention differs from the known apparatus because control and actuation means 8 to operate said means of delivery of water and soluble product separately, are set up to operate said means of delivery according to the method described above, i.e. to provide at least one delay or interruption of the mechanical stirring and/or of the delivery of powdered product.

FIGS. 3-6 show the sequence of the steps in two types of preparation: with coffee and powdered milk (FIGS. 3 and 5) and with expresso coffee (FIGS. 4 and 6). The beginning and the end of the steps discussed above are indicated with the references a)-f).

The invention will now be described with reference to the following examples.

EXAMPLE 1

Reference Example

Lattemacchiato is prepared according to the following sequence. Feeding of 100 ml of water at 82° C. Delivery into a mixing chamber of the type described with reference to FIG. 2 and with a diameter between 50-60 mm is started. Simultaneously with or immediately after the beginning of water dispensing step the rotor is switched on (13.000 rpm) and 12.0 g of powdered milk begins to be delivered. Powdered milk delivery stops after 5.0 seconds and the stirring stops after 7.5 seconds.

During all the above steps said milk is being dispensed into a 200 ml glass with diameter of 56 mm.

At the end of the water, a 50 ml portion of coffee is dispensed into the glass. The coffee penetrates the milk froth at one point and is quickly dispersed in all the milk, giving the beverage a substantially uniform beige coloration, despite being prepared at the same time but separately from the milk.

EXAMPLE 2

Preparation According to the Invention

Lattemacchiato is prepared according to example 1, with the difference that the rotor starts to rotate 2.5 seconds after the beginning of the powdered milk delivery, i.e. the rotor is operated with a delay of 2.5 seconds during which the powdered milk and the water reach the glass without being subjected to mechanical stirring.

At the end of the water delivery, a 50 ml portion of coffee is dispensed into the glass. Coffee penetrates the milk froth but remains stratified in the upper portion of the glass, positioned under the milk froth, giving the beverage the typical layered coloration of the better type of manually prepared lattemacchiato.

As mentioned above, interrupting stirring during dispensing enables particular textures of the beverage to be obtained, especially if such differences are accentuated by delivering different soluble products before and/or after a pause in the stirring step.

For instance, in an embodiment of the preparation of chocolate milk, after having dispensed the first portion of milk in the absence of mechanical stirring, a second portion of milk is prepared and delivered under mechanical stirring, then a portion of chocolate is prepared and delivered in the absence of stirring and a final portion of milk is prepared and delivered under stirring.

The resulting beverage is much more appealing both visually and to the taste than a traditional chocolate beverage produced from a single prepared product.

The invention claimed is:

1. A method for the preparation of a beverage by mixing water and at least one powdered soluble product to form a mixture in a mixing chamber having a rotor located inside the mixing chamber or externally to the mixing chamber and dispensing the mixture to a final container, characterized by comprising the following steps:
  preparing and dispensing to said final container a first portion of beverage by first mixing water or other liquid with a first powdered soluble product, substantially preventing incorporation of air into the water or other liquid by carrying out the first mixing throughout the preparing in an absence of mechanical stirring or with the rotor rotating at a low rotor speed of less than 500 rpm so as to form a first layer of beverage that has an absence of incorporated air;
  preparing and dispensing a second portion of beverage by second mixing water or other liquid with a second soluble powdered product, incorporating air into the water or other liquid by carrying out the second mixing in a presence of mechanical stirring so as to form a second layer of beverage with a density lower than a density of the first layer due to a presence of the air incorporated into the second layer of the beverage and to an absence of incorporated air in the first layer;
  dispensing further portions of beverage to the final container, wherein the presence of the mechanical stirring is carried out at a high rotor speed that produces a quantity of froth or emulsion, the low rotor speed improving dissolving without creating the quantity of the froth produced when the rotor is rotated at the high rotor speed.

2. The method according to claim 1, wherein said first and second powdered soluble products are the same product.

3. The method according to claim 2, comprising the following steps:
  a) begin delivery of the water into the mixing chamber,
  b) begin rotation of the rotor,
  c) begin delivery of the same product,
  d) end the delivery of the same product,
  e) end the delivery of the water, and
  f) end the rotation of the rotor,
  characterized by effecting step c) before step b).

4. The method according to claim 1 wherein the time interval of the absence of mechanical stirring or the low rotor speed is within a range of 1 to 40 seconds.

5. The method according to claim 4, wherein said time interval is within a range of 1 to 35 seconds.

6. The method according to claim 1, wherein the preparing and dispensing of the beverage in the absence of mechanical stirring or with the low rotor speed is repeated.

7. The method according to claim 1, further comprising preparing and dispensing to the final container a different powdered soluble product between the steps of preparing and dispensing said first and second portions of beverage.

8. The method according to claim 3, wherein the preparing of each of said first and second portions of beverage are in the mixing chamber, characterized by replacing a time interval between beginning the same product delivery (step c) and beginning stirring (step b) by a corresponding time interval in which reduced stirring is carried out to substantially prevent incorporation of air into said first portion of beverage.

9. The method according to claim 1, further comprising providing at least one step of interruption of delivery of the powdered soluble product to the mixing chamber, and resuming said delivery of the powdered soluble product after said interruption.

10. The method according to claim 3, further comprising dispensing the further portions of the beverage to the final container at least 5 seconds after an end of delivery of the water.

11. An apparatus for the preparation of a beverage comprising a mixing group including a mixing chamber, means for mixing and mechanical stirring, means for delivering water and means for delivering powdered soluble products to said mixing chamber, a rotor to mix water and powdered soluble products in said mixing chamber, means for controlling and actuating to separately operate said means for delivering water and said means for delivering the powdered soluble products, said rotor being operative with at least two speeds, a first of the speeds being 500 rpm or less in preparation of a first layer of the beverage and a second of the speeds being more than 500 rpm in preparation of a second layer of the beverage, said second speed being such as to incorporate air into said second layer of beverage and give to said second layer a density that is greater than a density of the first layer.

12. The apparatus according to claim 11, further comprising means for interrupting and resuming the delivery of the soluble products.

13. The apparatus according to claim 11, further comprising means for interrupting and resuming the delivery of the powdered soluble products.

14. An apparatus for the preparation of a beverage comprising a mixing group including a mixing chamber, means for mixing and mechanical stirring with a rotor, means for delivering water and means of for delivering powdered soluble products to said mixing chamber, as well as means for controlling and actuating to separately operate said means for delivering water and said means for delivering the powdered soluble products, wherein said means for controlling and actuating being set in such a way as to operate said means for mixing and mechanical stirring and said means for delivering water and means for delivering the soluble products to carry out the steps of:

preparing and dispensing to a final container a first portion of beverage by first mixing water or other liquid with a first powdered soluble product, substantially preventing incorporation of air into the water or other liquid by carrying out the first mixing throughout the preparing in an absence of mechanical stirring or with the rotor rotating at a low rotor speed of less than 500 rpm so as to form a first layer of beverage that has an absence of incorporated air;

preparing and dispensing a second portion of beverage by second mixing water or other liquid with a second powdered soluble product, incorporating air into the water or other liquid by carrying out said second mixing in a presence of mechanical stirring so as to form a second layer of beverage with a density lower than a density of the first layer due to a presence of the air incorporated into the second layer of the beverage and to an absence of incorporated air in the first layer;

dispensing further portions of beverage to the final container; and carrying out the presence of the mechanical stirring at a high rotor speed that produces a quantity of froth or emulsion, the low rotor speed improving dissolving without creating the quantity of the froth produced when the rotor is rotated at the high rotor speed.

15. The apparatus of claim 14, wherein said first and second powdered soluble products are the same product, said means for controlling and actuating being set in such a way as to operate said means for mixing and mechanical stirring and said means for delivering water and means for delivering the powdered soluble products to carry out the steps of:
a) begin delivery of the water into the mixing chamber,
b) begin rotation of the rotor,
c) begin delivery of the same product,
d) end the delivery of the same product,
e) end the delivery of the water, and
f) end the rotation of the rotor,
characterized by effecting step c) before step b).

16. The apparatus according to claim 15, further comprising means for interrupting and resuming the delivery of the powdered soluble products.

17. An apparatus for the preparation of a beverage comprising a mixing group including a mixing chamber, means for mixing and mechanical stirring, means for delivering water and means for delivering powdered soluble products to said mixing chamber, a rotor to mix water and powdered soluble products internally or externally in said mixing chamber, means for controlling and actuating to separately operate said means for delivering water and said means for delivering the powdered soluble products, said rotor being operative with at least two speeds, a first of the speeds being 500 rpm or less in preparation of a first layer of the beverage and a second of the speeds being more than 500 rpm in preparation of a second layer of the beverage, characterized by comprising means for carrying out the following steps: preparing and dispensing to said final container a first portion of beverage by first mixing water or other liquid with a first powdered soluble product, substantially preventing incorporation of air into the water or other liquid by carrying out the first mixing throughout the preparing in an absence of mechanical stirring or with the rotor rotating at a low rotor speed of less then 500 rpm so as to form a first layer of beverage that has an absence of incorporated air; preparing and dispensing a second portion of beverage by second mixing water or other liquid with a second soluble powdered product, incorporating air into the water or other liquid by carrying out the second mixing in a presence of mechanical stirring so as to form a second layer of beverage with a density lower than a density of the first layer due to a presence of the air incorporated into the second layer of the beverage and to an absence of incorporated air in the first layer; dispensing further portions of beverage to the final container.

* * * * *